June 4, 1935.                I. ARCHER                2,003,819
SAFETY DEVICE FOR CENTRIFUGAL PUMPS
Filed April 22, 1933
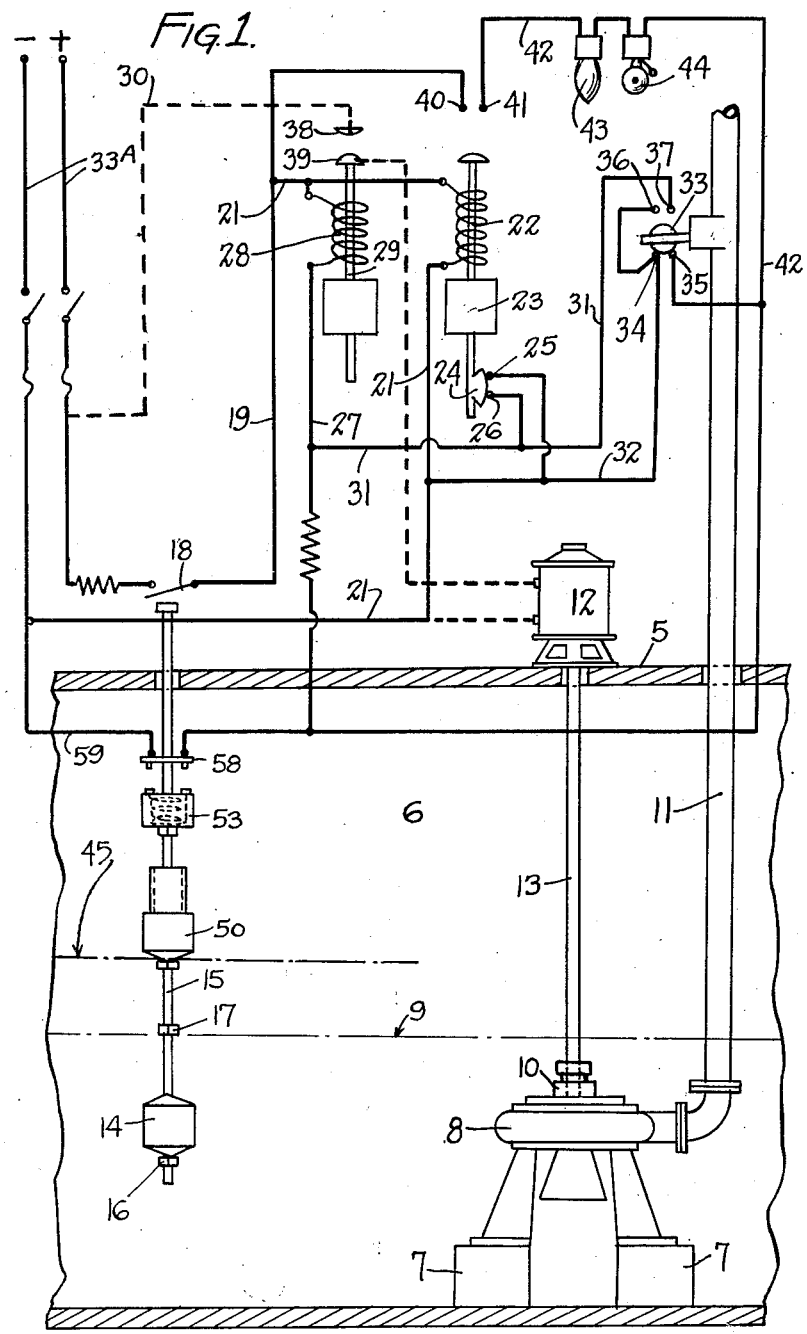
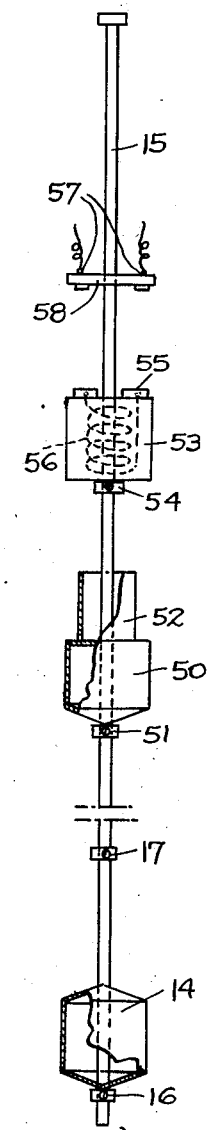
INVENTOR
IRA ARCHER
BY
John F. Lynch
ATTORNEY Patented June 4, 1935

2,003,819

UNITED STATES PATENT OFFICE 2,003,819

SAFETY DEVICE FOR CENTRIFUGAL PUMPS

Ira Archer, Brooklyn, N. Y.

Application April 22, 1933, Serial No. 667,426

4 Claims. (Cl. 103—26)

This invention relates to a safety device for centrifugal pumps whose bearings are water-lubricated, the type of bearing referred to being one that must be always submerged as is the pump in order to prevent the bearing from burning out.

Practically all vertical centrifugal pumps are supplied with water lubricated bearings, that is, the bearing which is located in the casing of the pump next to the impeller is actually cooled and lubricated by the water which the pump discharges, after drawing the same in. Several efforts have been made to lubricate these bearings by grease or self-lubricating bearing parts but in all instances, this has proven unsatisfactory because in grease bearings, the grease is washed out by the flow of the water and in self-lubricating substances, the same hardens when the water is not flowing and when the pump continues running, the bearing and the pump casing will over-heat when the pump and its bearing are not covered with water with the result that the bearing is burnt out and the pump is destroyed. Up to the present time no satisfactory bearing except the water lubricated bearing has been feasible in vertical centrifugal pumps and inasmuch as the impeller will operate against the casing of the pump unless the pump itself is covered with water, it is evident that when the level of the water drops below the pump, there is great danger of the bearing burning out and the pump destroying itself if some means is not provided for shutting off the motor when the water falls below a certain level.

In order to shut off the motor use has heretofore been made of float controlled float switches but these switches operate to close the circuit and start the motor when the water reaches a certain level but in many instances when the float falls, as the pump is operating, the float switch does not open or the float itself sticks with the result that the water is pumped clear of the pump and its bearing and yet the motor continues to run. It is an object of my invention, therefore, to provide an electric control which will operate to shut-off the motor even should the circuit be completed by the float switch when the water has fallen below the level of the pump, such means contemplating use of a pressure switch in the discharge line which maintains the circuit only as long as water is being pumped through the discharge line.

Changes and variations may be made in the construction shown and described without departing from the principles of the invention or sacrificing its chief advantages; hence such invention is not to be confined to the structures shown in the accompanying drawing, in which, Figure 1 is a diagrammatic view showing the arrangement of the parts employed in safeguarding a centrifugal pump that is submerged for normal operation, and Figure 2 is a view in elevation of the float rod upon which an emergency float and float switch are supported.

Referring to the drawing in detail, 5 indicates the top or roof of a sump 6 in which is supported, as at 7, the centrifugal pump 8, the water level being indicated by the numeral 9 and the pump bearing as at 10. The pump is arranged to discharge the water through a discharge line 11 which extends to the exterior of the sump or chamber 6.

The pump 8, being of the vertical centrifugal type, is provided with the pump shaft 13 which extends through and is operated by the motor 12, the motor being supported on said roof or top 5 of the chamber 6.

Use is made of a float 14 which is arranged to have free sliding movement on the float rod 15 between the points 16 and 17 and normally when the float is in the position illustrated in Figure 1, the motor should not be operated and the float switch 18 should be open. When the float 14 moves up under the influence of the rise of water in the chamber 6 and reaches the point 17, it moves with it the float rod 15 to close the float switch 18, thus completing a circuit through the wire 19 and wire 21 to energize the coil of a definite time relay 22. This definite time relay is of well-known mechanical construction and is delayed in its movement by a dash pot 23 or other similar construction so that the contact end 24 of the relay will break the circuit at the contacts 25—26 after a predetermined time interval. When the float switch 18 is closed, a current path is closed through the line 19, to energize the motor circuit coil 28, the solenoid core 29 of which moves to close the motor circuit 30 and start the motor 12 which in turn operates the pump 8 to lower the water in the chamber 6. The circuit of coil 28 is completed through lines 27, 31; contact piece 24 of the time relay, and contacts 25 and 26 which are in circuit with lines 31 and 32, the latter of which is connected to line 21, permitting the current to return to the negative side of the power line 33—A. Simultaneously, the current passes through line 21 and the time relay 22 is energized and the retarded core thereof begins to move the contact 24. The pump, however, having begun to operate, builds up pressure in the discharge line 11 and causes the pressure switch to move away from the contacts 34, 35 and into engagement with contacts 36 and 37. After contacts 36 and 37 are bridged, the contact portion 24 in its timed operation breaks the circuit through 25 and 26 but the motor continues to operate because the current through motor circuit coil 28 passes through line 31, contacts 36 and 37, lines 32 and 21 and back to line 33—A. The pump will lower the water in the pit or chamber 6 and if the operation of the self-closing switch 18 is normal, it will open when the weight of the float 14 is on the stop 16 on the float rod 15, and break the control circuit and consequently the motor circuit.

When the switch 18 does not open, however, there is danger of ruining not only the pump bearings but the pump itself and when the water pressure in the line 11 falls, the pressure switch 33 will leave the contacts 36 and 37 thus breaking the motor coil circuit and causing separation of the motor circuit contacts 38 and 39 and stoppage of the motor.

While the switch 18 is closed, the time relay 22 remains energized and keeps the contacts 40 and 41 bridged to complete an alarm circuit including the line 42 in which are disposed audible and visible alarm elements in the nature of a lamp 43 and a bell 44, through contacts 34 and 35, line 32 and line 21 to the power circuit 33—A, so that an attendant may be summoned to correct the trouble.

The pump will hence remain inoperative until the water again rises to what might be termed a maximum or dangerous level as indicated by the outline 45. Referring to Figure 2, the auxiliary or emergency float and float switch are illustrated as consisting of an emergency float 50 freely slidable on the float rod 15 and supported on the adjustable ring 51, said float having an extended collar portion 52 which, when the float 50 rises, lifts the spool 53 off its adjustable support ring 54 to advance the spool so that its upper face contact strips 55 which are connected by a coil 56, for quenching an arc, engage the contacts 57 secured in fibre disc 58 to complete a circuit in the line 59 (see Figure 1). The disc 58 is stationary, i. e., with regard to float 50 and spool 53. It is secured to rod 15 and moves with it.

When the water raises the float 50 to close the circuit in line 59, the motor circuit coil is energized and closes the motor circuit as the line 27 is also connected to line 59. The operation of the motor thus keeps the water from overflowing the pit or chamber 6 until an attendant restores the mechanism to normal operation by opening the switch 18. The alarm system is in operation because line 42 completes a circuit through line 59.

It is evident, therefore, that I have provided a device which has several advantages, first; it prevents the pump from running dry which is detrimental because in a vertical centrifugal pump during discharge, water sustains the impeller in a central position in the pump casing and prevents it from destroying the pump casing which it will do when operating without water and second; the pump can be tested in inspection operation for a few seconds without being completely submerged, the operation ceasing upon movement of the time relay; and third; the motor will not continue to operate when the pressure in the line 11 drops, thus assuring the coverage at all times of the bearing which is water lubricated.

My invention is not to be restricted to the precise details of construction shown since various changes and modifications may be made therein without departing from the scope of the invention or sacrificing the advantages derived from its use.

What I claim is:—

1. The combination with a motor operated centrifugal pump and discharge pipe for maintaining water in a chamber at a minimum level, of a circuit for said motor, a float and float rod in the chamber operable by a rise of water to close a self-opening float switch, a control circuit for said motor circuit including said self-opening float switch and a motor circuit maintaining member, a time relay for breaking the control circuit at a predetermined time, a switch operable by the water pressure in the discharge pipe for completing said control circuit before the same is broken by said relay, and an auxiliary float and float operated means for completing said control circuit upon an abnormal rise of water in the chamber.

2. The combination with a motor operated centrifugal pump and discharge pipe for maintaining water in a chamber at a minimum level, of a circuit for said motor, a float and float rod in the chamber operable by a rise of water to close a self-opening float switch, a control circuit for said motor circuit including said self-opening float switch and a motor circuit maintaining member, a time relay for breaking the control circuit at a predetermined time, a switch operable by normal water pressure in the discharge pipe for completing said control circuit before the same is broken by said relay, a signal circuit bridged by said time relay when the control circuit is broken thereby, said pressure switch forming a part of said signal circuit when the water pressure in the discharge pipe drops below normal, an auxiliary float and float operated means for completing said control circuit upon an abnormal rise of water in the chamber, and a signal in said signal circuit arranged to operate when the signal circuit is completed by failure of the float switch to open.

3. The combination with a motor operated centrifugal pump and discharge pipe for maintaining water in a chamber at a minimum level, of a circuit for said motor, a float and float rod in the chamber operable by a rise of water to close a self-opening float switch, a control circuit for said motor circuit including said self-opening float switch and a motor circuit maintaining solenoid, a time relay for breaking the control circuit, a pressure switch for maintaining the control circuit complete when pressure is present in the discharge pipe and after said control circuit is broken by the time relay, said pressure switch operating upon a fall in pressure in the pipe to open said control circuit and render said motor circuit maintaining solenoid ineffective when the float switch fails to open, an emergency circuit including said motor circuit maintaining solenoid, the first mentioned float switch and an emergency float switch, and an emergency float for closing said emergency switch to render the motor circuit maintaining solenoid effective.

4. The combination with a motor operated centrifugal pump and discharge pipe for maintaining water in a chamber at a minimum level, of a circuit for said motor, a float and a float rod in the chamber operable by a rise of water to close a self opening float switch, a control circuit for said motor circuit including said self opening float switch and a motor circuit maintaining solenoid, a time relay for breaking the control circuit, a pressure switch for maintaining the control circuit complete when pressure is present in the discharge pipe and after said control circuit is broken by the time relay, said pressure switch operating upon a fall in pressure in the pipe to open said control circuit and render said motor circuit maintaining solenoid ineffective when the float switch fails to open, an emergency circuit including said motor circuit maintaining solenoid, the first mentioned self opening float switch and an emergency float switch, an emergency float for closing said emergency switch to render the motor circuit maintaining solenoid effective, and an alarm signal circuit connected to the control and emergency circuits and arranged to be maintained closed by the time relay and the pressure switch when no pressure is present in said discharge line and the first mentioned float switch has failed to open, and by said time relay and the emergency float switch when said first mentioned float switch has not opened and said emergency float switch has been closed.

IRA ARCHER. [L. S.]